Nov. 3, 1931.  R. S. McINTOSH  1,830,369

CLUTCH TRANSMISSION

Filed March 14, 1930     2 Sheets-Sheet 1

ROY S. McINTOSH
INVENTOR

BY Munn + Co.

ATTORNEYS

Nov. 3, 1931.    R. S. McINTOSH    1,830,369
CLUTCH TRANSMISSION
Filed March 14, 1930    2 Sheets-Sheet 2
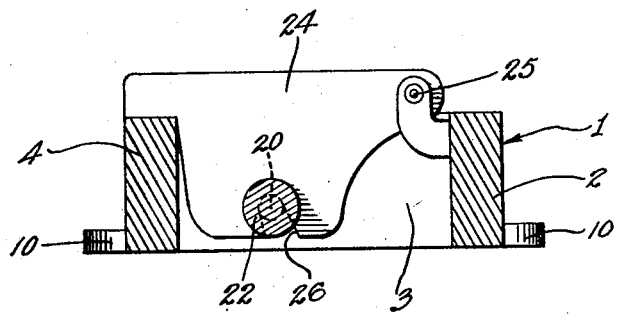
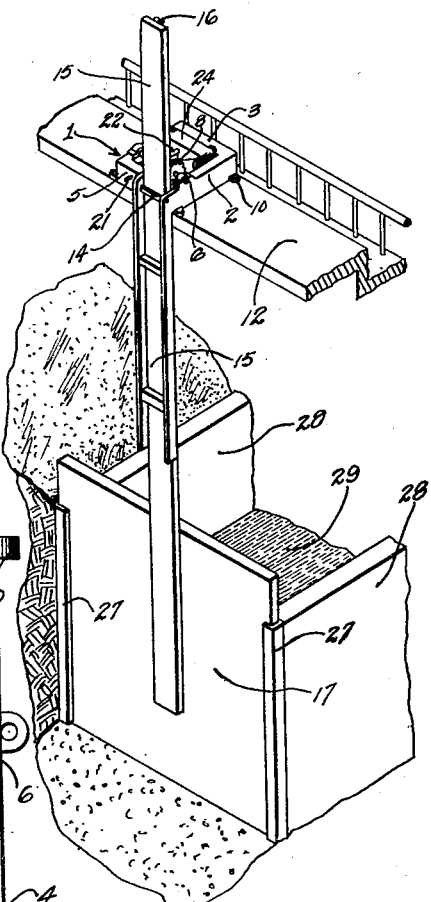
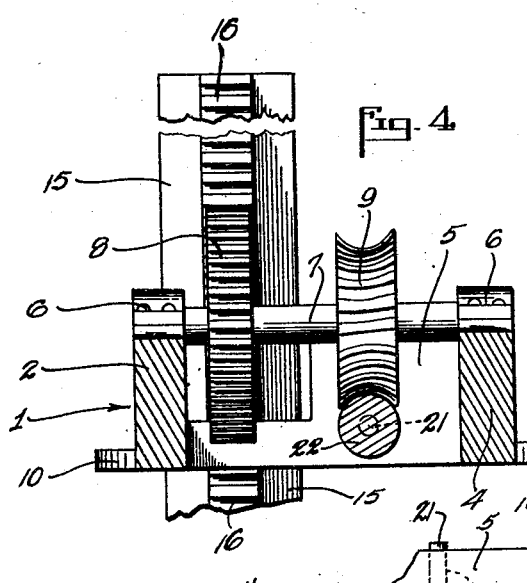
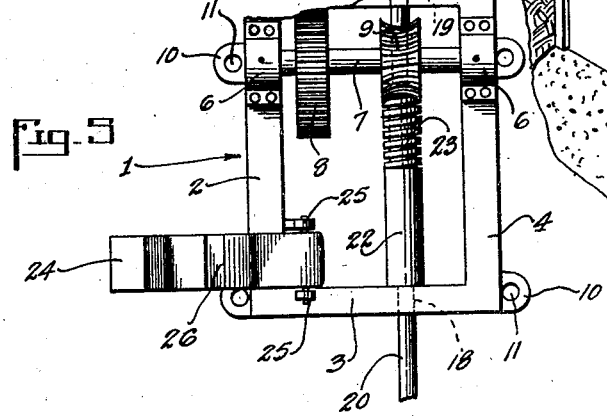
ROY S. McINTOSH
INVENTOR
BY Munn + Co.
ATTORNEYS Patented Nov. 3, 1931

1,830,369

UNITED STATES PATENT OFFICE

ROY S. McINTOSH, OF CHICAGO, ILLINOIS

CLUTCH TRANSMISSION

Application filed March 14, 1930. Serial No. 435,922.

My invention relates to improvements in clutch transmissions, and it consists in the combinations, constructions, and arrangements herein described and claimed.

An object of my invention is to provide a clutch transmission particularly adapted to be used in connection with head gates employed for irrigational purposes and similar uses, and in which novel means is provided whereby a relatively heavy weight may be lifted manually through the medium of a gear transmission, and also in which a novel releasing mechanism is used whereby the lifted weight is suddenly freed and permitted to drop freely.

A further object is to provide a clutch transmission comprising in combination a plurality of gears whereby an object may be positively moved and in which the releasing mechanism is constructed in such a manner that certain of the gear elements may be suddenly thrown out of mesh by the pulling action of the moved object.

A further object is to provide a clutch transmission constructed in a novel manner, whereby relatively heavy objects may be manually moved and with a minimum amount of effort.

Other objects and advantages will appear in the following specification, and the novel features of the invention will be particularly pointed out in the appended claims.

Figure 1:
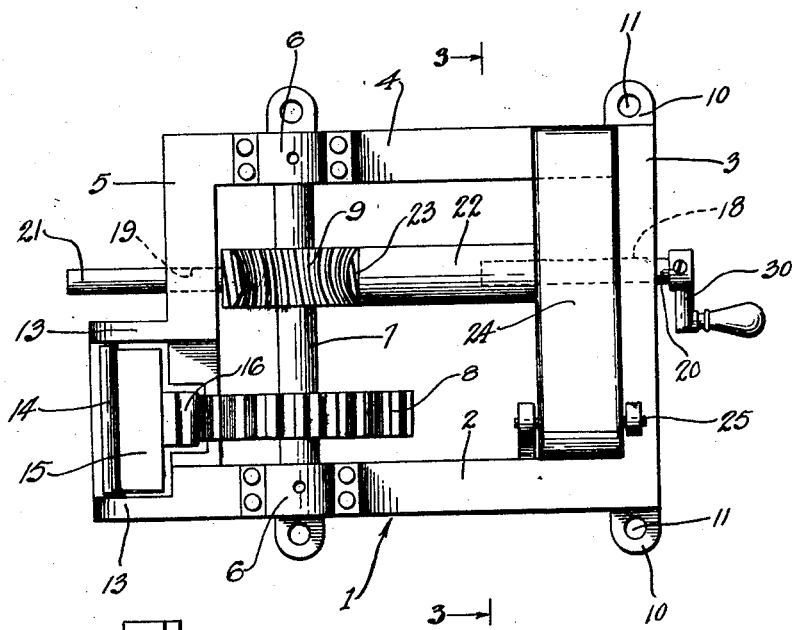
Figure 2:
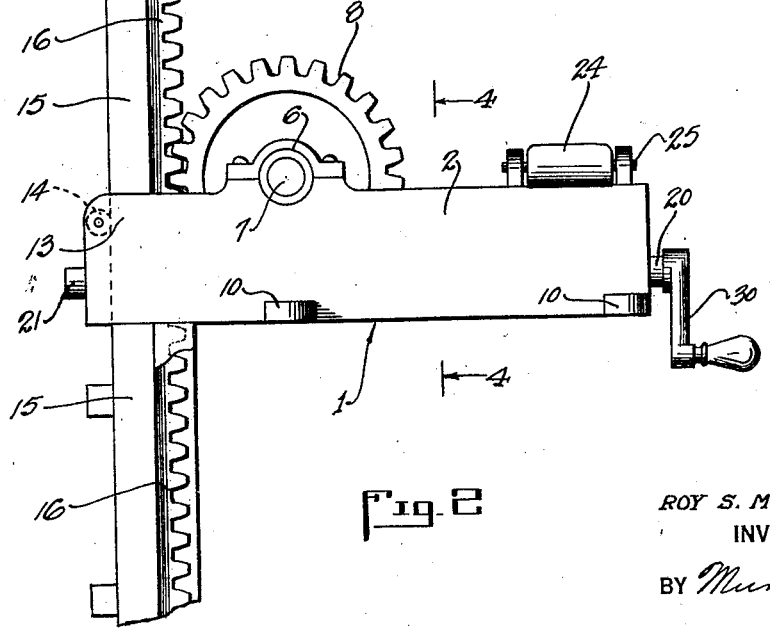

My invention is illustrated in the accompanying drawings, forming part of this application, in which Figure 1 is a top plan view of my invention, Figure 2 is a side elevation, Figure 3 is a sectional view taken along the line 3—3 of Figure 1, Figure 4 is a sectional view taken along the line 4—4 of Figure 2, Figure 5 is a detail view of a portion of my invention, and Figure 6 is a perspective view of an installation comprising a head gate and embodying my invention.

In carrying out my invention, I make use of a frame 1 comprising side portions 2 to 5, inclusive. The side portions 2 and 4 are provided with bearings 6 for supporting a shaft 7 upon which a gear 8 and a worm gear 9 are mounted. The two gears are fixed upon the shaft. The frame 1 may be an integral construction formed from cast material or the side portions may be secured together by any suitable means, such as welding and the like. I may also employ wood in lieu of metal in certain cases where I am confining the invention to light work.

The casing may be provided with lug portions 10 having openings 11 whereby the casing may be rigidly secured to any suitable supporting structure, as indicated at 12 in Figure 6. The side portion 5 is provided with a pair of flanges 13 for supporting a roller 14. A bar 15 is disposed adjacent the roller 14 and between the flanges 13 and is provided with a rack 16 which is disposed in mesh with the gear 8. The bar 15 is connected with a gate 17, see Figure 6. The roller provides non-frictional means against which the bar may slide and also holds the rack in proper relation with its associated gear 8.

The side portions 3 and 5 are provided with openings 18 and 19, respectively, through which reduced shaft portions 20 and 21 of a shaft 22 project. The reduced shaft portions are slidably and rotatably mounted within the openings. The shaft 22 is provided with a worm 23 which is normally disposed in mesh with the worm gear 9. A releasing member 24 is hingedly mounted at 25 upon the side portions 2 and 3 and is provided with a recess 26, see Figure 3, for receiving the shaft 20 when the releasing member is positioned as shown in Figures 1 and 3. At this time one side of the releasing member bears against the side portion 3 and the opposite side of the member bears against the end of the shaft 22. The releasing member 24 may be lifted away from the shaft 20 for releasing the worm 23, as will be explained later.

In Figure 6 I have shown the gate 17 as being guided between channel members 27. These members may be associated with wall portions 28 which are preferably formed from cement and the like. The walls provide directing elements for a stream of water 29. While I have shown a single gate in the present instance, it will be understood of course that a plurality of gates may be employed. It will also be understood that while my invention is defined as being related to irrigational systems, the invention is also applicable to other arts in which a quick release is desired.

In operation, the gate 17 may be lifted or positioned as for height by turning a crank 30 which is mounted upon the shaft 20 when the worm 23 is in mesh with the worm gear 9. At this time the releasing member 24 is of course positioned as shown in Figures 1 and 3. In other words, the releasing member holds the worm 23 in mesh with the gear 9.

It is desirable in irrigational installations to drop the gates suddenly for various reasons. This may be accomplished by moving the releasing member 24 for freeing the shaft 22. As soon as the releasing member is moved sufficiently far, the weight of the gate tends to rotate the shaft 7, which, in turn, throws the shaft 22 in the direction of the side portion 3, a distance sufficiently far to move the worm 23 out of mesh with the worm gear 9.

When the releasing member 24 is moved away from the shaft portions 20 and 22, the end of the shaft 22 strikes the side portion 3. It will be noted in referring to Figure 1 that the shaft portion 21 is of sufficient length to support the shaft 22 in its shifted position. When the shaft 22 has been thrown in the direction of the side portion 3 the full distance of its movement in this direction, the worm gear 9 is entirely out of mesh with the worm 23. An important feature in connection with my invention is the fact that the gate 17 may be raised a certain distance through the medium of the crank and its associated gears and the gate will remain in its shifted position by reason of the worm and worm gear arrangement. In other words, the gate may be raised or lowered manually to various positions and dropped suddenly by merely lifting the releasing member 24. My invention may be used in various arts where a quick release is desired and where it is desired to lift relatively heavy weights with a minimum amount of effort.

I claim:

1. A clutch transmission comprising a frame, gear means associated with the frame and adapted for lifting an object, a shaft mounted upon said frame and being provided with a gear disposed in mesh with said gear means and a worm gear, a shaft movable in directions paralleling its longitudinal axis and provided with a worm normally disposed in mesh with said worm gear, and a movable releasing member for limiting the movement of said second-named shaft and holding said worm in mesh with said worm gear, said releasing member being arranged for movement away from said second-named shaft whereby said worm will be thrown out of mesh with the worm gear by the movement of said gear means.

2. A clutch transmission comprising a frame, gear means associated with the frame and adapted for lifting an object, a shaft mounted upon said frame and being provided with a gear disposed in mesh with said gear means and a worm gear, a shaft movable in directions paralleling its longitudinal axis and provided with a worm normally disposed in mesh with said worm gear, and a movable releasing member for limiting the movement of said second-named shaft and holding said worm in mesh with said worm gear, said releasing member being arranged for movement away from said second-named shaft whereby said worm will be thrown out of mesh with the worm gear by the movement of said gear means, said releasing member being adapted to hold said second-named shaft against rotation under normal conditions.

3. A clutch transmission comprising a frame, gear means associated with the frame and adapted for lifting an object, a shaft mounted upon said frame and being provided with a gear disposed in mesh with said gear means and a worm gear, a shaft movable in directions paralleling its longitudinal axis and provided with a worm normally disposed in mesh with said worm gear, a movable releasing member for limiting the movement of said second-named shaft and holding said worm in mesh with said worm gear, said releasing member being arranged for movement away from said second-named shaft whereby said worm will be thrown out of mesh with the worm gear by the movement of said gear means, said releasing member being adapted to hold said second-named shaft against rotation under normal conditions, and means for guiding said gear means.

4. A clutch transmission comprising a frame, gear means associated with the frame and adapted for lifting an object, a shaft mounted upon said frame and being provided with a gear disposed in mesh with said gear means and a worm gear, a shaft movable in directions paralleling its longitudinal axis and provided with a worm normally disposed in mesh with said worm gear, a movable releasing member for limiting the movement of said second-named shaft and holding said worm in mesh with said worm gear, said releasing member being arranged for movement away from said second-named shaft whereby said worm will be thrown out of mesh with the worm gear by the movement of said gear means, said releasing member being adapted to hold said second-named shaft against rotation under normal conditions, means for guiding said gear means, and a gate associated with said gear means.

5. A clutch transmission comprising a frame, gear means associated with the frame and adapted for lifting an object, a shaft mounted upon said frame and being provided with a gear disposed in mesh with said gear means and a worm gear, a shaft movable in directions paralleling its longitudinal axis and provided with a worm normally disposed in mesh with said worm gear, a movable releasing member for limiting the movement of said second-named shaft and holding said worm in mesh with said worm gear, said releasing member being arranged for movement away from said second-named shaft whereby said worm will be thrown out of mesh with the worm gear by the movement of said gear means, said releasing member being adapted to hold said second-named shaft against rotation under normal conditions, means for guiding said gear means, a gate associated with said gear means, and guide means for said gate.

6. In a device of the type described, a frame, a shaft rotatably carried by the frame and adapted to move in the direction of its longitudinal axis, a worm carried by said shaft, a second shaft disposed at right angles to the first-named shaft and having a worm gear, a rack, a gear upon said second-named shaft for operating said rack, and removable means disposed between one end of the frame and arranged to engage a portion of the first-named shaft for normally preventing longitudinal movement of the shaft and adapted when removed to permit the movement of the shaft and the disengagement of the worm with the worm gear.

7. In a device of the type described, a frame, a shaft rotatably carried by the frame and adapted to move in the direction of its longitudinal axis, a worm carried by said shaft, a second shaft disposed at right angles to the first-named shaft and having a worm gear, a rack, a gear upon said second-named shaft for operating said rack, and a hinged stop member arranged to bear on one side on the frame and on the other upon a portion of the first-named shaft for preventing the longitudinal movement of the latter and adapted when swung out of engagement with the shaft to permit the movement of the shaft and the disengagement of the worm and gear.

Signed at Chicago, in the county of Cook and State of Illinois this 11th day of March, A. D. 1930.

ROY S. McINTOSH.